(12) United States Patent
Tsukuda

(10) Patent No.: US 10,070,082 B2
(45) Date of Patent: Sep. 4, 2018

(54) RADIATION IMAGING APPARATUS AND METHOD OF CONTROLLING RADIATION IMAGING APPARATUS

(71) Applicant: CANON KABUSHIKI KAISHA, Tokyo (JP)

(72) Inventor: Akira Tsukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 15/270,580

(22) Filed: Sep. 20, 2016

(65) Prior Publication Data

US 2017/0104940 A1 Apr. 13, 2017

(30) Foreign Application Priority Data

Oct. 9, 2015 (JP) .................................. 2015-201538

(51) Int. Cl.
*H04N 5/359* (2011.01)
*H04N 5/353* (2011.01)
*H04N 5/357* (2011.01)
*H04N 5/367* (2011.01)

(52) U.S. Cl.
CPC .......... *H04N 5/359* (2013.01); *H04N 5/3535* (2013.01); *H04N 5/3575* (2013.01); *H04N 5/3675* (2013.01)

(58) Field of Classification Search
CPC .... H04N 5/359; H04N 5/3575; H04N 5/3535; H04N 5/3675
See application file for complete search history.

(56) References Cited

U.S. PATENT DOCUMENTS

| 8,546,765 B2* | 10/2013 | Ruetten | ..................... G01T 1/24 |
| | | | 250/370.09 |
| 2005/0288882 A1* | 12/2005 | Pavkovich | ........... G01D 18/008 |
| | | | 702/88 |
| 2006/0231875 A1* | 10/2006 | Patrick | .............. H01L 27/14609 |
| | | | 257/292 |

(Continued)

FOREIGN PATENT DOCUMENTS

JP 2014-013950 1/2014

OTHER PUBLICATIONS

C. Schmidgunst et al., "Calibration model of a dual gain flat panel detector for 2D and 3D x-ray imaging", *Medical Physics*, 34(9), pp. 3649-3664 (Aug. 24, 2007).

(Continued)

*Primary Examiner* — Timothy J Henn
(74) *Attorney, Agent, or Firm* — Fitzpatrick Cella Harper and Scinto

(57) ABSTRACT

A radiation imaging apparatus that has a plurality of pixels capable of outputting an image signal in accordance with an irradiation of radiation comprises a photoelectric conversion unit which has a first capacitance and a second capacitance as charge accumulation capacitances and a gain correction unit configured to correct a pixel value in relation to a dose of the irradiated radiation based on an image signal outputted in accordance with a charge accumulated by the photoelectric conversion unit. The gain correction unit changes an interval of gain correction points at which to perform correction in accordance with a switch from a first capacitance to a second capacitance.

20 Claims, 10 Drawing Sheets

(56) References Cited

U.S. PATENT DOCUMENTS

| | | | | |
|---|---|---|---|---|
| 2006/0233305 A1* | 10/2006 | Hornig | ............... | A61B 6/4225 378/98.7 |
| 2007/0023798 A1* | 2/2007 | McKee | ............ | H01L 27/14603 257/291 |
| 2007/0065038 A1* | 3/2007 | Maschauer | ............... | G06T 5/50 382/274 |
| 2010/0020933 A1* | 1/2010 | Topfer | ..................... | G06T 5/50 378/98.11 |
| 2010/0140455 A1* | 6/2010 | Nathan | .................... | G01D 5/24 250/214 A |
| 2013/0140467 A1* | 6/2013 | Kitano | ............. | H01L 27/14663 250/393 |
| 2013/0187028 A1* | 7/2013 | Salvestrini | ............. | H04N 5/378 250/208.1 |
| 2014/0050301 A1* | 2/2014 | Liu | ......................... | G06T 5/009 378/62 |
| 2014/0263950 A1* | 9/2014 | Fenigstein | ............ | H04N 5/355 250/208.1 |
| 2015/0192684 A1* | 7/2015 | Ito | ......................... | A61B 6/542 250/362 |
| 2015/0257726 A1 | 9/2015 | Tsukuda | ................. | A61B 6/547 |

OTHER PUBLICATIONS

P. G. Roos et al., "Multiple gain ranging readout method to extend the dynamic range of amorphous silicon flat panel imagers", *Proceedings of SPIE*, vol. 5368, pp. 139-149 (2004).

\* cited by examiner

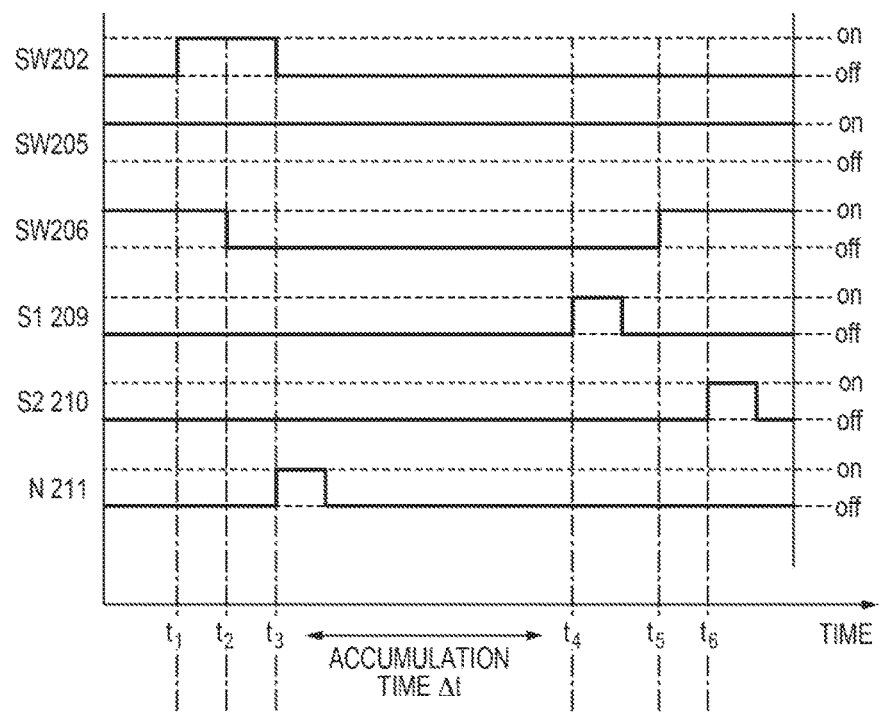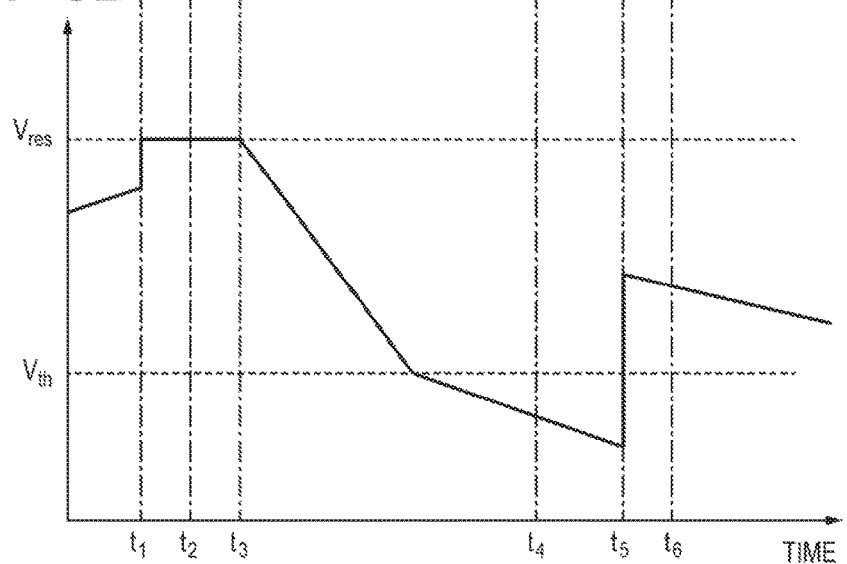

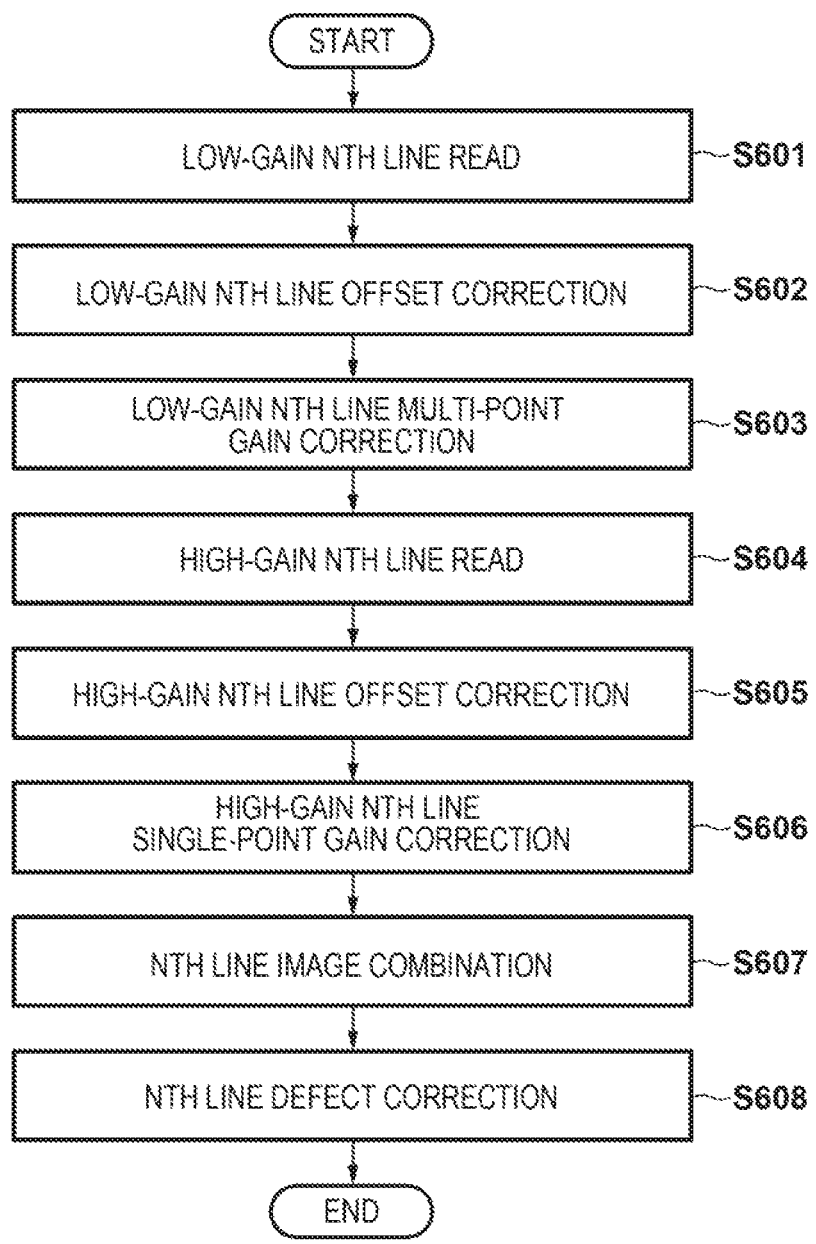

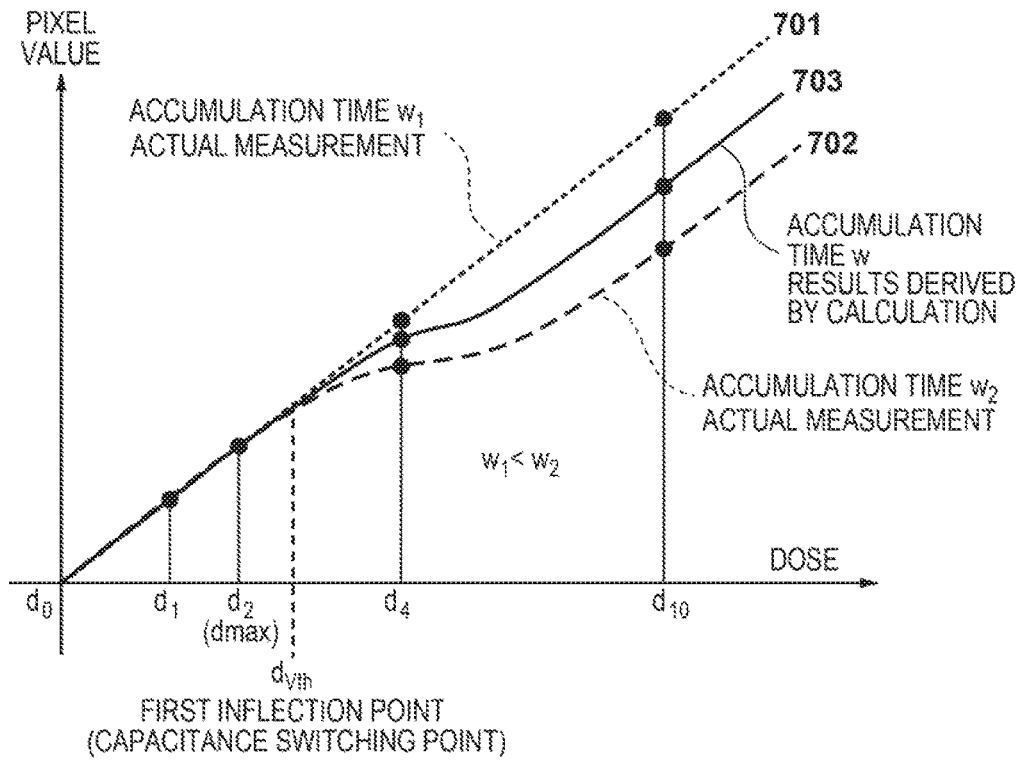
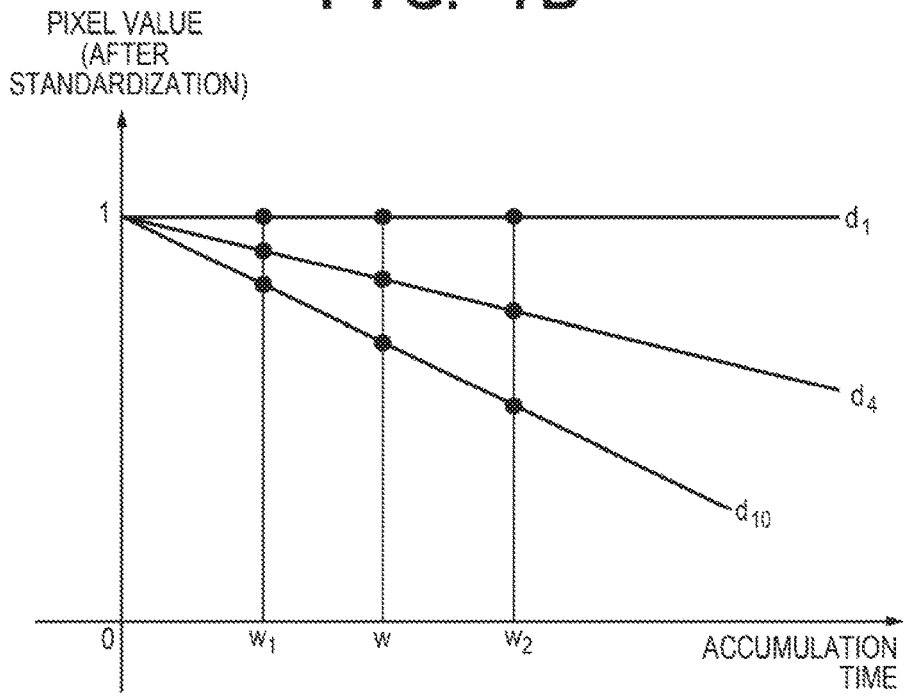

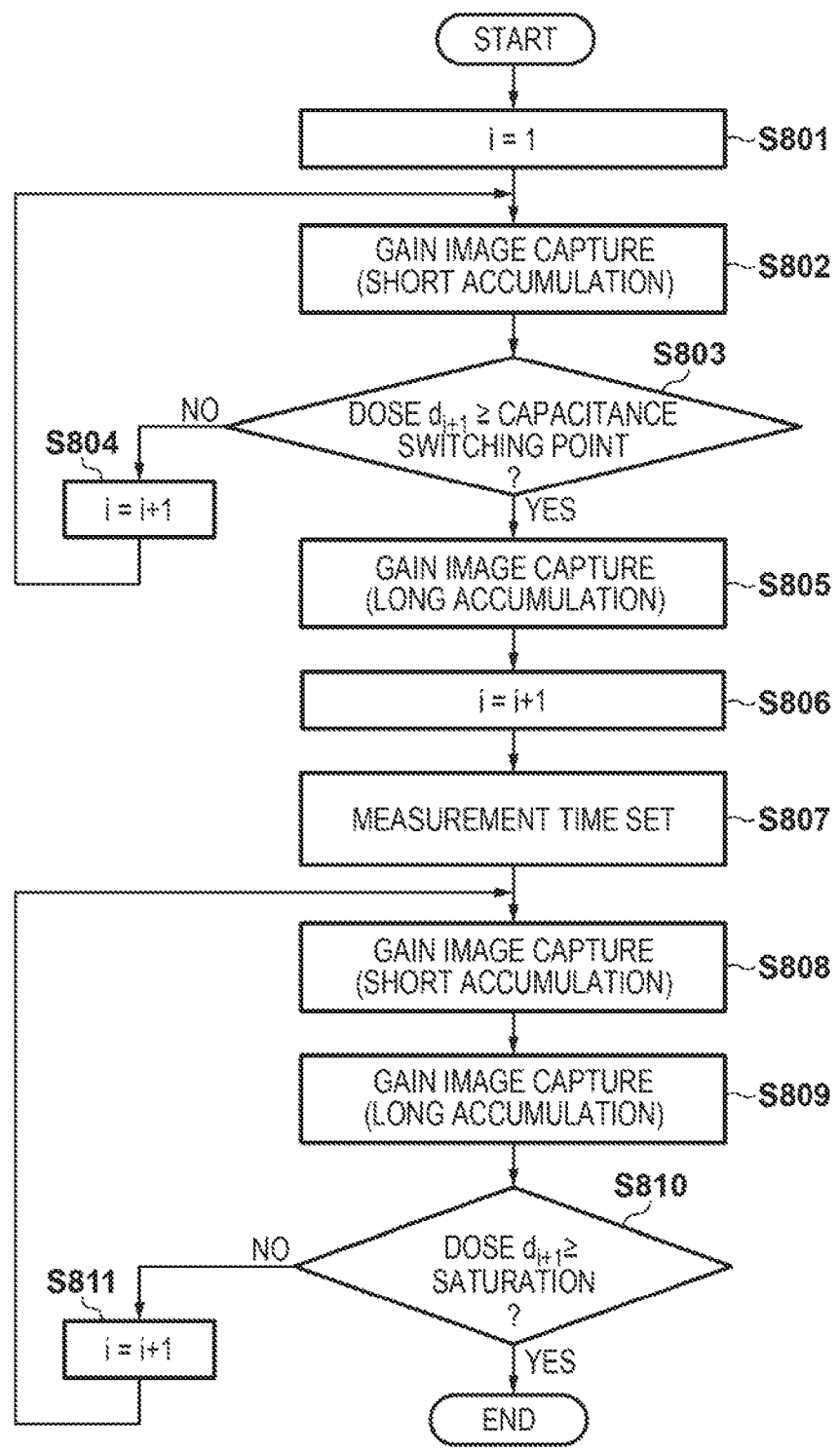

RADIATION IMAGING APPARATUS AND METHOD OF CONTROLLING RADIATION IMAGING APPARATUS

BACKGROUND OF THE INVENTION

Field of the Invention

The present invention relates to a radiation imaging apparatus and a method of controlling a radiation imaging apparatus.

Description of the Related Art

Regarding radiation imaging apparatuses, gain correction is performed in order to suppress pixel sensitivity fluctuation, but there are cases in which if pixel nonlinearity is large, pixel sensitivity fluctuation remains even with gain correction, and a signal-to-noise ratio (SNR) of an image is reduced.

In non-patent document 1 (C. Schmidgunst et al. "Calibration model of a dual gain flat panel detector for 2D and 3D x-ray imaging", Medical physics 34(9) page 3649 (2007)), multi-point gain correction that makes precise approximations by gain correction to improve the high dose side SNR of the image by obtaining a plurality of calibration points is disclosed. Also, in patent literature 1 (Japanese Patent Laid-Open No. 2014-13950), as an improvement of multi-point gain correction, a method in which a low-dose region of a gain correction is approximated by a linear expression, and a high-dose region is approximated by a polynomial expression is disclosed.

However, a large number of calibration points is necessary to ensure a high signal-to-noise ratio when applying the method recited in patent literature 1 and non-patent document 1.

The present invention, in view of the foregoing problem, provides a capturing technique by which it is possible to obtain a high signal-to-noise ratio image with less calibration points.

SUMMARY OF THE INVENTION

According to one aspect of the present invention, there is provided a radiation imaging apparatus that has a plurality of pixels capable of outputting an image signal in accordance with an irradiation of radiation, the apparatus comprising: a photoelectric conversion unit configured to have a first capacitance and a second capacitance as charge accumulation capacitances; and a gain correction unit configured to correct a pixel value in relation to a dose of the irradiated radiation based on an image signal outputted in accordance with a charge accumulated by the photoelectric conversion unit, wherein the gain correction unit changes, in accordance with a switch from the first capacitance to the second capacitance, an interval of gain correction points at which to perform the correction.

According to another aspect of the present invention, there is provided a method of controlling a radiation imaging apparatus having a plurality of pixels capable of outputting an image signal in accordance with an irradiation of radiation and a photoelectric conversion unit that has a first capacitance and a second capacitance as charge accumulation capacitances, the method comprising: correcting a pixel value in relation to a dose of the irradiated radiation based on an image signal outputted in accordance with a charge accumulated by the photoelectric conversion unit, wherein, an interval of gain correction points at which to perform the correction is changed in accordance with a switch from the first capacitance to the second capacitance.

By virtue of the present invention, it is possible to provide a capturing technique by which it is possible to obtain a high signal-to-noise ratio image with less calibration points.

Further features of the present invention will become apparent from the following description of exemplary embodiments (with reference to the attached drawings).

BRIEF DESCRIPTION OF THE DRAWINGS

FIGS. 3A and 3B are views illustrating voltage changes and driving of the image capture apparatus according to embodiments.

FIG. 6 is a view illustrating a capture procedure of the radiation imaging apparatus.

FIG. 7A-FIG. 7B are views illustrating an accumulation time dependency in a relation between pixel value and dose.

FIG. 8 is a view illustrating a flow of capturing gain images for 2 accumulation times.

DESCRIPTION OF THE EMBODIMENTS

Explanation of examples is given in detail below for embodiments of the present invention with reference to the drawings. However, the elements described in the embodiments are simply examples, and the technical scope of the present invention is determined by the scope of the patent claims, and is not limited by following individual embodiments.

Figure 1:
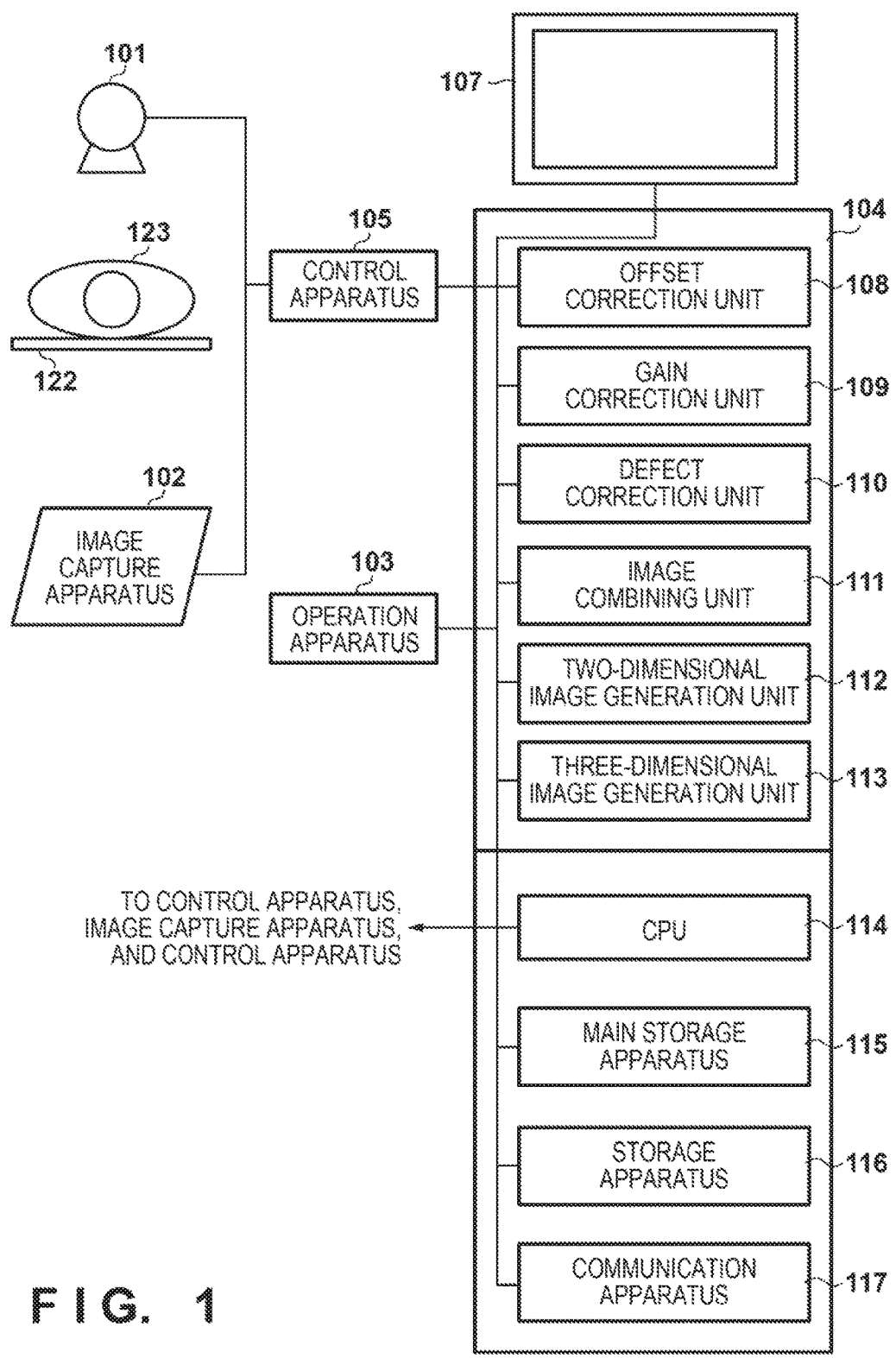
FIG. 1 is a view illustrating a configuration of a radiation imaging apparatus according to embodiments.

FIG. 1 is a view illustrating a configuration of a radiation imaging apparatus according to embodiments. A radiation imaging apparatus according to embodiments includes a plurality of pixels capable of outputting an image signal in accordance with an irradiation of radiation. For radiation emitted by a radiation generation unit 101, conversion to a digital value from the radiation is performed in an image capture apparatus 102 after the radiation passes through an object 123 and a detector holder 122. The image capture apparatus 102 comprises a photoelectric conversion unit (photodiode) which has a first capacitance and a second capacitance as charge accumulation capacitances and additional capacitance units (capacitors 203 and 204) having a charge accumulation region different to the photoelectric conversion unit. The image capture apparatus 102 comprises switching units (switches 205 and 206) for switching to a state in which the additional capacitance units are connected to the photoelectric conversion unit, or to a state in which the additional capacitance units are not connected to the photoelectric conversion unit. Also, the image capture apparatus 102 comprises a first signal holding unit (a sample-and-hold circuit 209) that holds a first image signal outputted based on a charge accumulated in the photoelectric conversion unit in the state in which the additional capacitance units are not connected, and a second signal holding unit (a sample-and-hold circuit 210) that holds a second image signal outputted based on a charge accumulated in the state in which the photoelectric conversion unit and the additional capacitance units are connected.

A gain correction unit 109 corrects a pixel value for a dose of the irradiated radiation based on the first image signal held in the first signal holding unit or the second image signal held in the second signal holding unit, and the gain correction unit 109 changes an interval of gain correction points at which correction is performed at a capacitance switching point at which a destination of accumulation of charge by saturation is changed from the first capacitance to the second capacitance.

Figure 10:
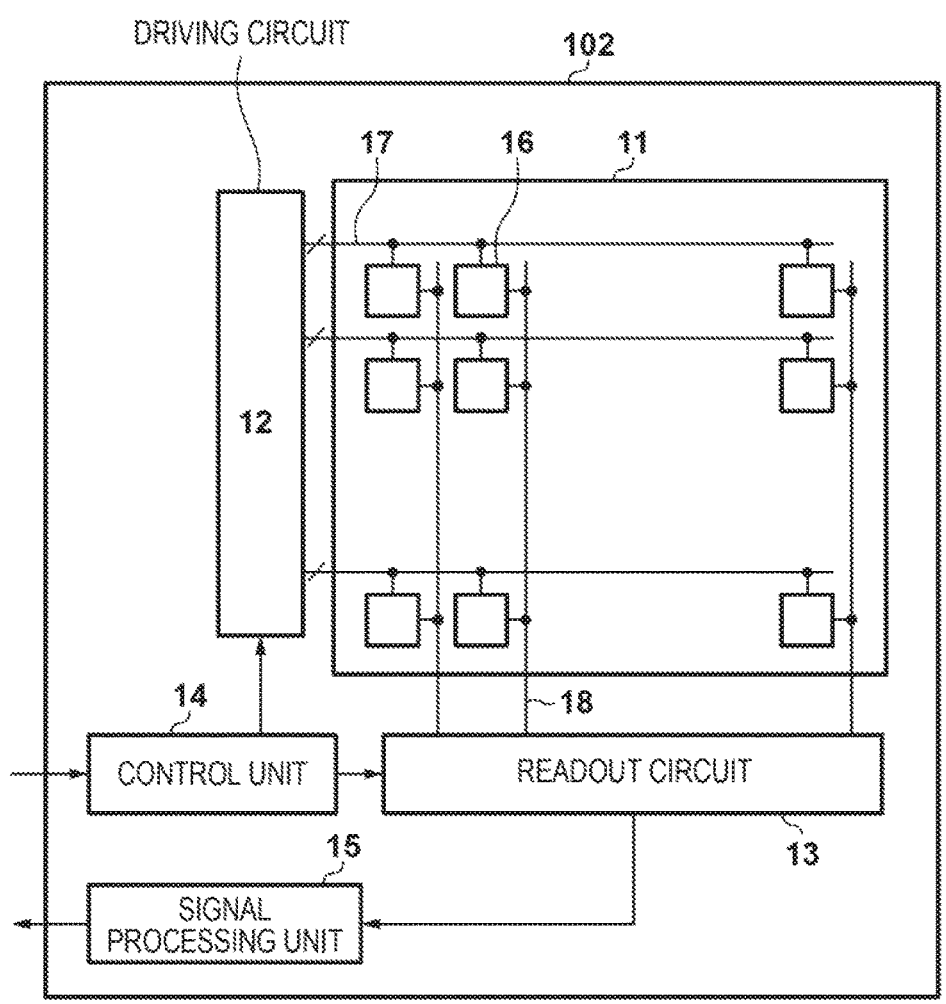
FIG. 10 is a view for describing an example configuration of the image capture apparatus according to embodiments.

In the image capture apparatus 102, for example, a scintillator for converting radiation to visible light and an electrical circuit (such as an amplifier circuit or an analog-to-digital converter) for reading pixel values are included. FIG. 10 is a view for describing an example configuration of the image capture apparatus 102 according to embodiments. The image capture apparatus 102 comprises a pixel array 11, a driving circuit 12, a readout circuit 13, a control unit 14 and a signal processing unit 15. On the pixel array 11, pixels 16 that output a signal in accordance with incident light are arranged in an array (a two dimensional region). The driving circuit 12, in accordance with instructions from the control unit 14, supplies control signals to the pixels 16 on each line via a driving line 17. The readout circuit 13, in accordance with instructions from the control unit 14, reads the signals outputted to a signal line 18 from the pixels 16 on each column, and outputs to the signal processing unit 15. The signal processing unit 15 decides and outputs the pixel values of each of the pixels 16 based on the signal outputted from each of the pixels 16. The control unit 14 receives control signals from a control apparatus 105 to control the driving circuit 12 and the readout circuit 13.

An operator instructs capturing through an operation apparatus 103. The instruction for capturing is inputted to a computer 104 and the control apparatus 105, and the control apparatus 105 performs capturing control that instructs capturing to a photoelectric conversion unit of the image capture apparatus 102 and the radiation generation unit 101. The control apparatus 105 performs capturing control to cause the radiation generation unit 101 and the image capture apparatus 102 to synchronize. The control apparatus 105 transfers an image obtained from the image capture apparatus 102 to the computer 104. The computer 104 functions as an image processing apparatus that executes necessary image processing, and performs display control to cause the image, after the image processing is performed on it, to display on a display apparatus 107 such as a liquid crystal display.

The computer 104 comprises an offset correction unit 108, the gain correction unit 109, a defect correction unit 110, an image combining unit 111, a two-dimensional image generation unit 112 and a three-dimensional image generation unit 113, and performs image processing of images captured by the image capture apparatus 102 using these units. The offset correction unit 108, the gain correction unit 109, the defect correction unit 110, the image combining unit 111, the two-dimensional image generation unit 112 and the three-dimensional image generation unit 113 are formed by a CPU (a central arithmetic processing device) 114, a main storage apparatus 115, and a storage apparatus 116 in the computer. A communication apparatus 117 is provided to perform communication with the image capture apparatus 102, the operation apparatus 103, and the control apparatus 105. The gain correction unit 109 corrects a pixel value for a dose of the irradiated radiation based on an image signal outputted in accordance with a charge accumulated in the photoelectric conversion units including the photodiode. More specifically, the gain correction unit 109 is able to correct a pixel value for a dose of irradiated radiation based on a first image signal outputted based on a charge accumulated in a photoelectric conversion unit including a photodiode, or a second image signal outputted based on a charge accumulated in a state in which the photoelectric conversion unit and an additional capacitance unit are connected.

The gain correction unit 109 changes an interval of gain correction points at which to perform correction in accordance with a switch from a first capacitance to a second capacitance. Specifically, the gain correction unit 109 changes an interval of gain correction points at which correction is performed at a capacitance switching point at which the destination of accumulation of charge switches from the first capacitance to the second capacitance. The gain correction unit is able to change the interval of gain correction points for correcting a pixel value for a dose that is irradiated at the capacitance switching point at which the destination of accumulation of charge by saturation changes from the first capacitance to the second capacitance.

Figure 2A:
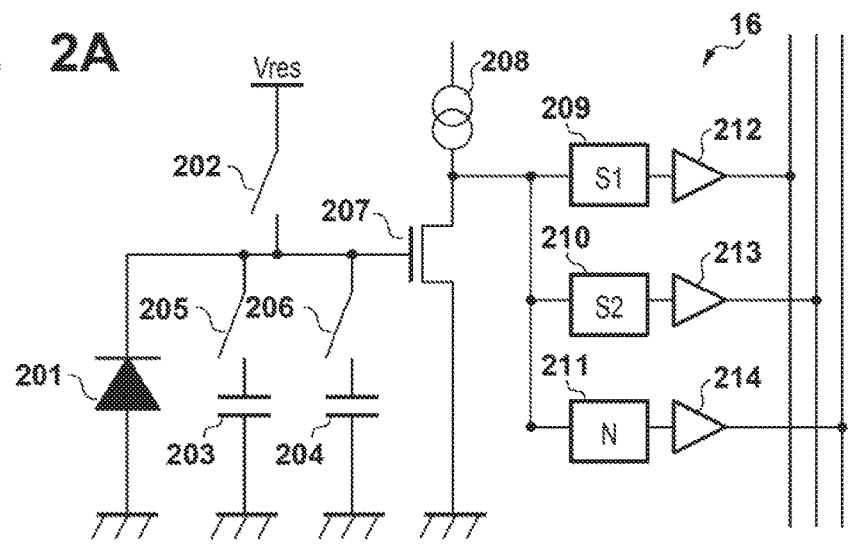
FIG. 2A-FIG. 2C are views illustrating detail of an image capture apparatus according to embodiments.

FIG. 2A is a view illustrating a structure of a pixel circuit in the pixels 16 of the image capture apparatus 102. The pixels 16 comprise a photodiode 201 (the photoelectric conversion unit), a switch 202 for performing a reset of a charge of the pixel, the capacitors 203 and 204 (the additional capacitance units) for changing pixel sensitivity, the switches 205 and 206 (switching units) to select whether or not to change the pixel sensitivity, a source follower circuit 207 for reading a voltage value of the pixel, a constant current source 208, sample-and-hold circuits 209, 210, and 211 and output amplifiers 212, 213, and 214.

The sample-and-hold circuit 209 (first signal holding unit) samples and holds a first image signal, the sample-and-hold circuit 210 (second signal holding unit) samples and holds a second image signal, and the sample-and-hold circuit 211 (third signal holding unit) samples and holds a noise signal. By comprising the sample-and-hold circuit 211 for the noise signal, it is possible to subtract the noise included in the sample-and-hold circuit 209 of the first image signal and the sample-and-hold circuit 210 of the second image signal. By comprising the two capacitors 203 and 204, it is possible to select a combination having more gain. The state of the pixel circuit in which the capacitors 203 and 204 are not connected is called HIGH GAIN state, the state of the pixel circuit in which the capacitor 203 is not connected is called MID GAIN state, and the state of the pixel circuit in which both of the capacitors 203 and 204 are connected is called LOW GAIN state. In the present embodiment, the two capacitors of capacitors 203 and 204 are prepared, but a similar phenomenon as in the present embodiment arises even with a single capacitor, so a method similar to that of the present embodiment is applicable.

Figure 2B:
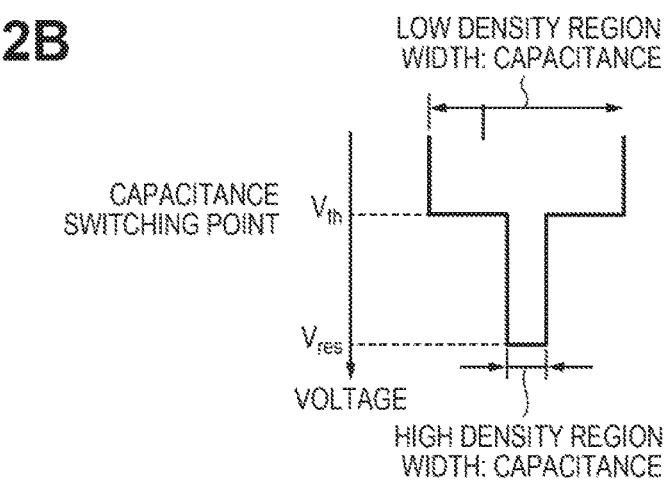

Also FIG. 2B is a view illustrating a relation between the capacitance and the voltage of the photodiode 201 schematically. As illustrated in FIG. 2B, the photodiode in the present embodiment has a structure in which if the voltage reaches a point Vth the capacitance increases suddenly. This structure can be realized by forming a high density electron region whose volume is small, for example, in the photodiode.

Figure 2C:
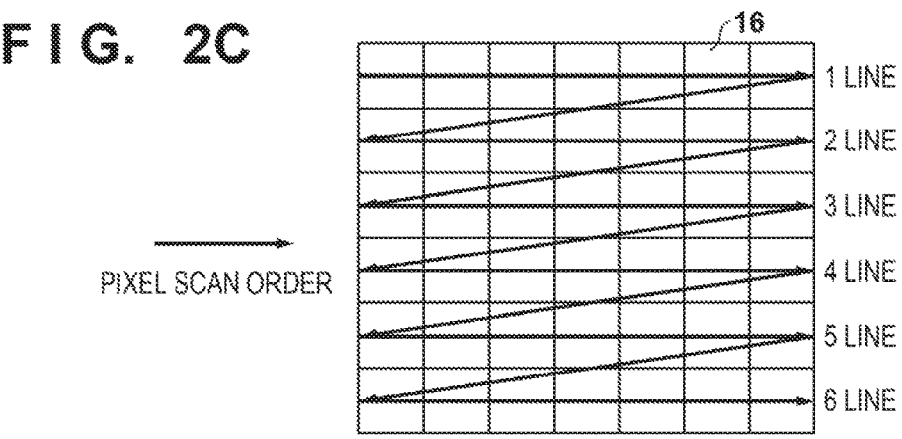

Also FIG. 2C is a view illustrating a scan order of the image capture apparatus 102 exemplarily. Respective rectangular partial areas in FIG. 2C illustrate the pixel circuits of the pixels 16 illustrated in FIG. 2A. Arrows in FIG. 2C represent a scan order of the pixels (a pixel scan order), and indicate that the pixels 16 are scanned line-by-line.

FIG. 3A is a timing chart illustrating an operation of the image capture apparatus 102, and FIG. 3B is a view illustrating changes in the voltage of a temporal sequence corresponding to the timing chart. SW 202 indicates a state of the switch 202, and SW 205 indicates a state of the switch 205. Also, SW 206 indicates a state of a switch 206, S1_209 indicates a hold timing of the sample-and-hold circuit 209, and S2_210 indicates a hold timing of the sample-and-hold circuit 210. Also, N211 indicates a hold timing of the sample-and-hold circuit 211.

Because the switch 205 is always in the on state, the capacitor 203 is always connected with the photodiode 201 in parallel in the driving. First, turning on the switch of SW 202 makes the voltage of the circuit a reset voltage Vres at a time t1. At a time t2, the switch 206 which connects to the capacitor of the low-gain side is put into the off state to temporarily disconnect the capacitor 204 from the circuit. Here, the pixel circuit enters MID GAIN state.

Next, at a time t3, the sample-and-hold circuit 211 for the noise is put into an on state to perform sampling and holding of the value of the noise. From here, accumulation of radiation is initiated. Continuing on, a time t4 is a time at which accumulation of the radiation finishes, and the first sample-and-hold circuit 209 (S1) is put in the on state to perform sampling and holding in MID GAIN state. After that, at a time t5, the switch 206 is put in the on state to connect the circuit of the capacitor 204, putting the circuit in LOW GAIN state. After that, at the time t6, the second sample-and-hold circuit 210 (S2) is put in the on state to save the voltage value in LOW GAIN state. By holding the sample-and-hold circuit, it becomes possible to realize a global shutter.

Because there is a restriction for the maximum input voltage of the source follower circuit, if the gain is not switched, the dynamic range that can be realized by a single gain is limited. However, it becomes possible to obtain a high dynamic range image by switching from a high-gain (MID GAIN in the foregoing description) to a low-gain (similarly, LOW GAIN) to obtain the image by the two gains as above described. The method of performing sample and holds by two gains, and reading the values of the sample and holds is called a multiple gain readout. Performing a sample and hold with a high-gain is called a high-gain sample and hold, and performing a sample and hold with a low-gain is called a low-gain sample and hold.

Here, high-gain indicates that the gain is a relatively high-gain in the multiple gain readout, and low-gain indicates that the gain is a relatively low-gain in the multiple gain readout. For example, in the driving indicated in FIG. 3A, a MID GAIN sample and hold is performed at the first sample and hold, and a LOW GAIN sample and hold is performed at the second sample and hold, and here high-gain indicates MID GAIN and low-gain indicates LOW GAIN. Another 2 types of multiple gain readouts are possible in the circuit illustrated in FIG. 2A. As the first of the other multiple gain readouts, driving is performed to carry out a HIGH GAIN sample and hold in the first sample and hold and a LOW GAIN sample and hold in the second sample and hold. In this driving, high-gain is HIGH GAIN, and low-gain is LOW GAIN.

As the second of the other multiple gain readouts, driving is performed to carry out a HIGH GAIN sample and hold in the first sample and hold and a MID GAIN sample and hold in the second sample and hold. In this driving, high-gain is HIGH GAIN, and low-gain is MID GAIN.

Note, although even a multiple gain readout is possible even with a single capacitor such as the capacitor 203 and the capacitor 204, there is only one type of combination of gains for which the multiple gain readout is possible in such a case. Also, in image capture conditions in which a single gain image is sufficient, readout of a single gain is possible by omitting the capacitor connection at t5 and the sample and hold by S2 at t6. If a high-gain (for example HIGH GAIN) is necessary in the reading of a single gain, the switch 205 and the switch 206 are turned off at the time t2. Meanwhile, if a high saturation dose (for example LOW GAIN) is necessary, the switch 205 and the switch 206 are turned on at the time t2. Such a reading method by a single gain is called a single gain readout.

A mechanism for switching the gain and the sample-and-hold circuits are comprised in each pixel in the present embodiment. A method of enlarging dynamic range by a method of switching the gain of an amplifier circuit of a radiation detector is recited in non-patent document 2 (Pieter G. Roos et al. "Multiple gain ranging readout method to extend the dynamic range of amorphous silicon flat panel imagers", Proceedings of SPIE Vol. 5368 139 pages), but in such a case it is impossible to achieve both a global shutter and the dynamic range enlargement. Also because the amplifier circuit is required additionally, the cost will increase. By comprising the gain switching mechanism and three sample-and-hold circuits in each pixel circuit as in the present embodiment, it becomes possible to achieve both the global shutter and the dynamic range enlargement.

In particular, because the image capture apparatus 102 rotates at a high rate around the object 123 when capturing a tomographic image, if as in non-patent document 2 the image capture apparatus is not global shutter, there are cases in which the image is distorted and artifacts occur in the tomographic image. The radiation imaging apparatus in the present embodiment can suppress artifacts that are caused in the case of non-patent document 2 because it is possible to achieve both dynamic range enlargement and global shutter.

Figure 4:
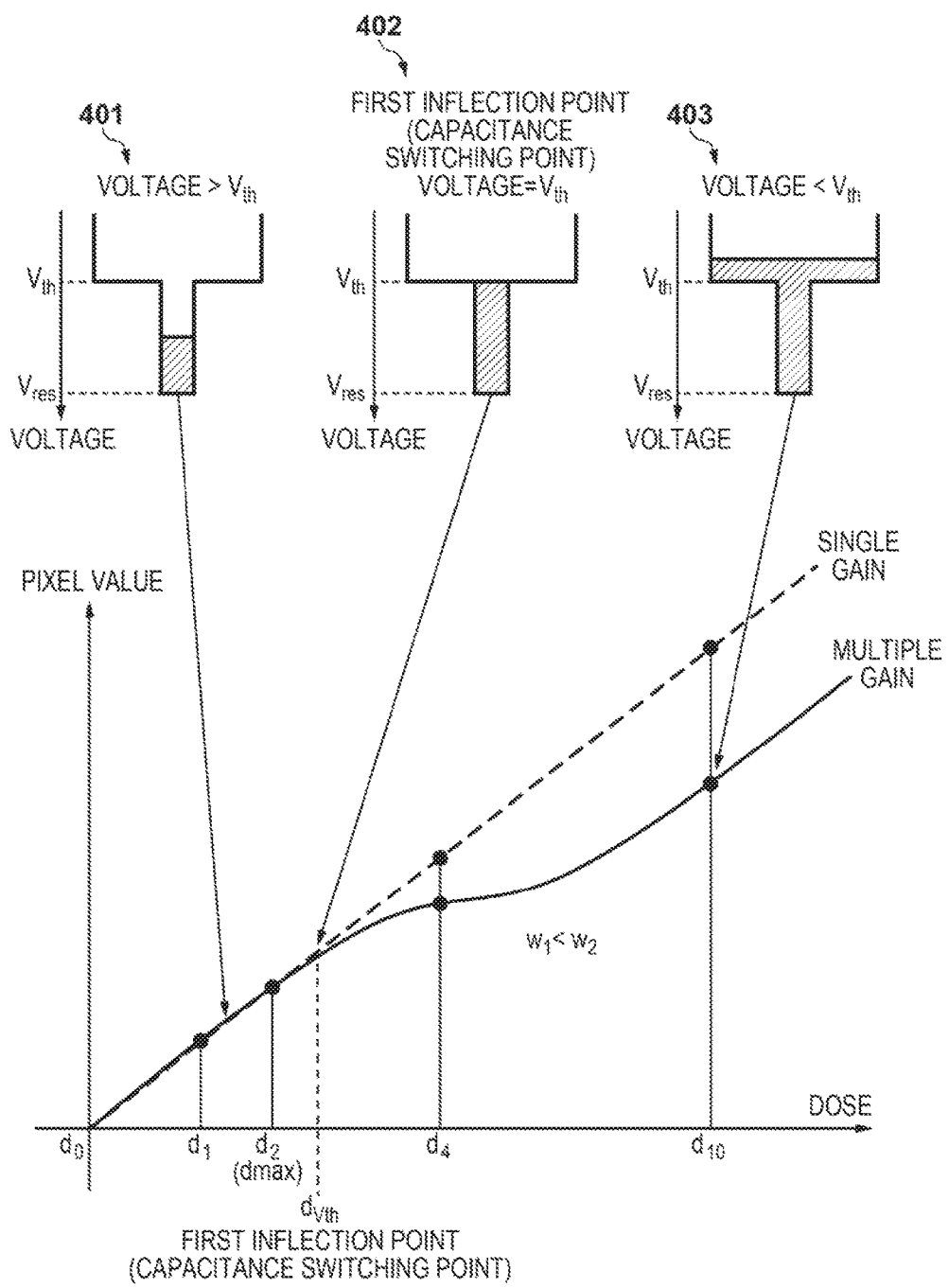
FIG. 4 is a view illustrating a pixel value dose dependency of the image capture apparatus.

FIG. 4 is a view illustrating a pixel value dose dependency of the image capture apparatus. This pixel value dose dependency is called a gain curve. The gain curve indicated by a broken line in the graph is a gain curve in a single gain readout, and the gain curve indicated by a solid line in the graph is the gain curve by a multiple gain readout. As shown in the figure, compared to the single gain readout, the pixel values have a tendency to be reduced, in particular at a high dose, in a multiple gain readout.

This is related to the structure of the photodiode. When the voltage of the photodiode is high, charge which is generated in the photodiode accumulates in a first capacitance region in which electrons are at a high density in the photodiode (401). Specifically, the charge is accumulated in a low capacitance portion. Meanwhile, if a high density region is saturated (402), the generated charge cannot accumulate in the high density region, and so the generated charge starts to accumulate in a second capacitance region of a low density region (403). Here, because the area of the photodiode is larger for the low density region, a leak of charge occurs dramatically more easily compared with the high density region. Specifically, a leak of the charge starts to occur when the threshold voltage Vth where the generated electrons start to accumulate in the low density region of the photodiode is reached. This threshold voltage Vth is referred to as a first inflection point or the capacitance switching point.

Specifically, in radiation imaging apparatuses that use this pixel structure, leakage of charge occurs at a dose starting from where the voltage of the photodiode reaches the capacitance switching point Vth, and linearity of the pixel deteriorates at doses which are higher than this capacitance switching point Vth.

Figure 5:
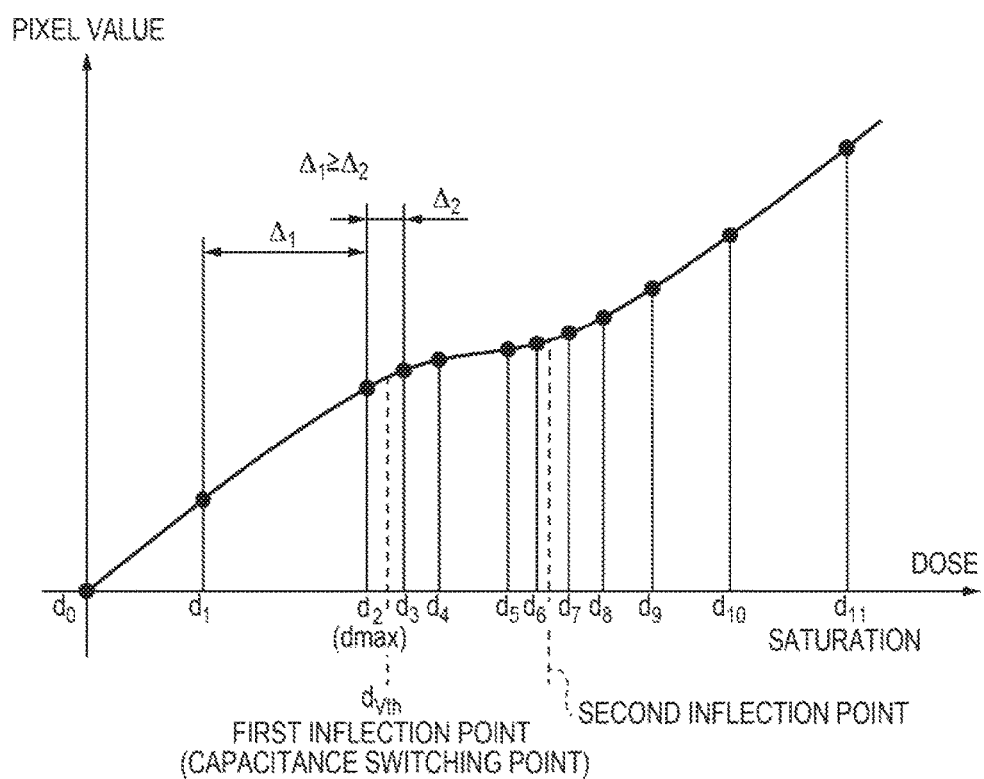
FIG. 5 is a view illustrating a dosage interval of a gain calibration of the radiation imaging apparatus.

Accordingly in the present embodiment, the number of calibration points for gain correction is changed from the proximity of the capacitance switching point Vth at which this leaking starts. Specifically, an interval of gain correction points at which pixel values for doses that are irradiated are corrected is changed at the capacitance switching point at which the destination of accumulation of charge by saturation changes from the first capacitance to the second capacitance. More specifically, the change causes an interval of gain correction points to increase. FIG. 5 is a view illustrating gain calibration dosage intervals of the radiation imaging apparatus. For example, the gain correction unit 109 sets the interval between gain correction points in which the capacitance switching point is included to be narrower than the interval between gain correction points in which the capacitance switching point is not included. Also, the gain correction unit 109 sets to increase the interval of gain correction points in accordance with the dose increasing in excess of the capacitance switching point. Also, the gain correction unit 109 sets to increase the interval of gain correction points in accordance with the dose decreasing from the capacitance switching point.

In FIG. 5, dn (n=0, 1, 2, . . . ) express the calibration doses of the detector. The interval between the maximum calibration dose dmax (d2 illustrated in FIG. 5) that is less than or equal to the dose of a first inflection point dVth at which the capacitance changes and the calibration point d1, which is one previous to dmax, is made to be Δ1. Also, when the interval between the minimum dose d3 larger than the first inflection point dVth and dmax is made to be Δ2, the gain correction unit 109 sets the calibration interval so that the relation of Δ1≥Δ2 holds.

The gain correction unit 109 gradually sets the intervals between calibration points to be wider than Δ2 at doses larger than d3 (monotonic increase in a broad sense). For gain correction interpolation it is possible to use any one of a least-squares method (for example, a 3rd order least-squares method), a linear interpolation, or a spline interpolation. The gain correction unit 109 uses any one of a least-squares method, a linear interpolation, or a spline interpolation to obtain correction values in the set gain correction point intervals. These interpolation methods can be decided according to the required gain correction precision, computation cost, and gain curve properties. For example, in the case of linear interpolation and spline interpolation, cases in which the gain curve can have a local maximum value or a local minimum value are more numerous than with a least-squares method. Accordingly, by investigating whether or not the gain curve can have an extreme value in advance for cases where these interpolation methods are used, it becomes possible to perform more effective interpolation processing. For example, it is possible to confirm whether or not the gain curve can have an extreme value by investigating the slope of the curve after interpolation by the respective interpolation methods.

For example, as is recited in patent literature 1, there is a tendency for the intervals between gain calibration points to be made wider the higher the dose becomes. That is, when the method recited in patent literature 1 is applied, the measurement intervals monotonically increase in accordance with dose increase, and $$\min(\{\Delta d \geq d\max\}) > \max(\{\Delta d \leq d\max\}) \text{ holds.}$$

Here, min ({•}) is the minimum value of the set {•}, and max({•}) is the maximum value of the set {•}. {Δd≤dmax} is the set of calibration measurement intervals when the calibration dose is dmax or less, and {Δd≥dmax} is the set of calibration measurement intervals when the calibration dose is dmax or more. dmax is the maximum calibration dose less than or equal to the capacitance switching point Vth, and dmax is the dose corresponding to d2 of FIG. 5.

In the present embodiment, a feature is that the calibration measurement interval (dosage interval) is made to decrease when straddling the capacitance switching point Vth (first inflection point). In the present embodiment, there is the feature that min ({Δd≥dmax})<max ({Δd≤dmax}).

In the foregoing example, an example in which the calibration interval is made to be decreased when straddling the capacitance switching point Vth (first inflection point) is recited as an example of changing the calibration interval, but methods that change (cause to decrease) an increase rate of calibration intervals in relation to the dose, for example, are included in the changing the calibration interval.

A radiation generation unit normally comprises shading, and a dose of a central portion becomes higher and a dose of a peripheral portion becomes lower when irradiating radiation. Accordingly, it is when the dose of the central portion reaches the dose dVth of the first inflection point that calibration points start to be taken finely, and when at least the peripheral portion reaches the dose dVth, it is necessary to continue taking calibration points finely. The plurality of pixels of the image capture apparatus 102 are arranged in a two dimensional region, and the gain correction unit 109 obtains doses of pixels arranged in a central portion of the two dimensional region and doses of pixels arranged in a peripheral portion of the two dimensional region. The gain correction unit 109 can change the intervals of the gain correction points based on the doses of the pixels arranged in the central portion and the doses of the pixels arranged in the peripheral portion. The gain correction unit 109 sets the intervals of the gain correction points to be narrower when the doses of the pixels arranged in the central portion and the doses of the pixels arranged in the peripheral portion reach the dose corresponding to the capacitance switching point. Also, for an inflection point other than the capacitance switching point, the gain correction unit 109 sets the intervals of gain correction points to be narrower when the doses of the pixels arranged in the central portion and the doses of the pixels arranged in the peripheral portion reach the dose corresponding to the inflection point.

It is possible to determine whether or not the central portion reached the dose dVth by arranging a, for example, 128×128 pixel region of interest (ROI) in the central portion and obtaining an average value of doses in the region of interest of the central portion. Meanwhile, when deciding the minimum pixel value of the peripheral portion, it is possible to make the determination by selecting one corner of the four corners in the case where the detector is rectangular or square, setting a region of interest similar to that of the central portion for the selected corner, and then obtaining an average value of the doses of that region of interest.

Considering other elements (for example a heel effect) for which shading is caused to occur, to more correctly determine the maximum value (dmax) of the doses, a region of interest (ROI) is displaced from the center, or a corner out of the four corners that a dose least corresponds to is decided. To decide the region of interest (ROI) more correctly, a radiation image of a proximity of the capacitance switching point Vth (first inflection point) and a dark image may be obtained, and an offset correction of the radiation image by the dark image may be performed to set a portion whose pixel value is the largest and a portion whose pixel value is the smallest in the image as regions of interest (ROI).

Also, there are cases where the radiation imaging apparatus has a second inflection point corresponding to between d6 and d7 illustrated in FIG. 5. This second inflection point is unknown because it is determined depending on differing leak speeds (leakage amounts per unit time) for each pixel. However, because leak speed is decided by a semiconductor process, the second inflection point often fits into a certain range. For this reason, it is possible to obtain an estimate dose for the second inflection point as a parameter of the image capture apparatus in advance, save it in the main storage apparatus 115 or the storage apparatus 116, and set the intervals of gain correction points such that a calibration interval decreases in a proximity of the second inflection point. For example, the gain correction unit 109 obtains information of included inflection points other than the capacitance switching point in the gain curve that indicates a relation between dose and pixel value, and sets and interval of gain correction points in which an inflection point is included to be narrower than an interval of gain correction points in which no inflection point is included. Also, the gain correction unit 109 sets to increase the interval of gain correction points in accordance with the dose increasing in excess of the inflection point. Also, the gain correction unit 109 sets to increase the interval of gain correction points in accordance with the dose decreasing from the inflection point.

By setting to cause intervals of calibration points that are not a portion of the capacitance switching point Vth (first inflection point) or the second inflection point to increase, it becomes possible to determine a gain curve with less calibration points. Regions of interest (ROI) are set for the second inflection point similarly to the capacitance switching point Vth (first inflection point) to measure the doses of a central portion and a peripheral portion. It is when the dose of the central portion reaches the dose of the second inflection point that calibration points start to be taken finely, and setting is such that calibration points continue to be taken finely until the peripheral portion also reaches the dose.

After the dose of the peripheral portion becomes larger than the dose of the first inflection point or the dose of the second inflection point, the intervals between calibration points are caused to gradually increase (intervals monotonically increase in the wide sense, except of the cases of the first inflection point and the second inflection point). That calibration is performed at such points is because calibration points are caused to increase since the gain curve approaches a straight line again at doses sufficient larger than these inflection points.

If there is both a first inflection point and a second inflection point, intervals of calibration points (dosage intervals) become sparse in the proximity of doses between the first inflection point and the second inflection point, but in the proximity of the first inflection point or the proximity of the second inflection point the intervals of calibration points (dosage intervals) become dense. At doses lower than the first inflection point and doses higher than the second inflection point, intervals of calibration points (dosage intervals) become sparse (dosage intervals become longer). Note that since the second inflection point is unknown in contrast to the first inflection point, the increase rate of dosage intervals in relation to doses in the proximity of the second inflection point is set to be lower than the increase rate of the dosage intervals in relation to the dose of the first inflection point.

FIG. 6 is a view illustrating an image processing flow for after image capturing as a capture procedure of the radiation imaging apparatus. Firstly, in step S601, the offset correction unit 108 reads out a low-gain (LOW GAIN in the present embodiment) image. To read out means that the computer 104 obtains values that the image capture apparatus 102 sampled and held via the control apparatus 105. This flow expresses a flow in a multiple gain readout. Reading out of an image is performed line-by-line as illustrated in FIG. 2C. An image captured by the image capture apparatus 102 is transferred to the computer 104 via the control apparatus 105.

In step S602, the offset correction unit 108 performs an offset correction of an obtained low-gain image (a read out image) using an offset image of that line obtained in advance. For the offset image, information of a low-gain side in a dark image read out in a multiple gain readout is employed.

In step S603, the gain correction unit 109 performs a multi-point gain correction using a low-gain image of that line. The gain curve used in the multi-point gain correction is obtained by the previously described method, and something that sets intervals of calibration points in the proximity of the capacitance switching point Vth (first inflection point) and the second inflection point more finely is used. The method of gain correction after obtaining the gain curve is omitted because it is described in various documents. Offset correction and gain correction can be executed in the computer 104, but the computer 104 can also obtain a result processed in another computer (image processing apparatus) via the communication apparatus 117.

In step S604, the offset correction unit 108 obtains a high-gain (HIGH GAIN in the present embodiment) image. Then, in step S605, the offset correction unit 108 performs an offset correction (a high-gain offset correction) of an obtained high-gain image using an offset image of that line obtained in advance. Then, in step S606, the gain correction unit 109 performs a single gain correction. On the high-gain side, the source follower circuit 207 saturates prior to the generated charge reaching the low density region of the photodiode 201, and so linearity is better than on the low-gain side since there is no influence due to a photodiode leak. For this reason, for gain correction on the high-gain side, it is possible to perform sufficient correction in a single point gain correction. If nonlinearity is due to properties other than those of the photodiode such as nonlinearity of the source follower circuit 207, a multi-point gain correction may be performed irrespective of whether or not there is leakage.

In step S607, the image combining unit 111 combines the low-gain image corrected in the preceding step S601 to step S603 and the high-gain image corrected in step S604 to step S606. Image combining is performed by dividing into the cases a.), b.), and c.) below, based on pixel values on the high-gain side Phigher after applying a sensitivity ratio G of a high-gain and a sensitivity of a low-gain to the image on the low-gain side first.

a.) Phigher<(high-gain saturation dose pixel value×0.8): Pmixed=Phigher b.) (high-gain saturation dose pixel value×0.8)≤Phigher< (high-gain saturation dose pixel value×0.9): Pmixed=(1−k (Phigher)) Phigher+k(Phigher)Plower c.) (high-gain saturation dose pixel value×0.9)≤Phigher: Pmixed=Plower Pmixed: a pixel value of an image after combination Phigher: a pixel value of a high-gain side (after multiplication of sensitivity ratio G)

Plower: a pixel value of a low-gain side $$k(x){:}k(x)=(x-0.8\times \text{saturation dose})/(0.1\times \text{saturation dose})$$

For the gain sensitivity G, for example, a gain sensitivity measurement may be performed independently, and it may determined at a time of an obtainment of a gain image in advance. Also, rather than obtaining the gain sensitivity G for separate doses, it may be performed at the same dose and in a range of (high-gain saturation dose pixel value×0.8) ≤Phigher<(high-gain saturation dose pixel value×0.9). For example, it may be performed in a proximity of 0.85 times the saturation dose of the high-gain. For the gain sensitivity G, it is possible to determine a region of interest (ROI) which is a rectangle of ¼ the area and is for a central portion of an image for each image after, for example, an image of high-gain and an image of low-gain are offset corrected respectively to obtain an average value (such as an arithmetic average or a median) of the dose for each region of interest (ROI), and the gain sensitivity G can be obtained by dividing the average value of the dose of the high-gain by the average value of the dose of the low-gain.

In step S608, the defect correction unit 110 performs defect correction of the image. As explained previously, the gain correction unit 109 uses any one of a least-squares method, a linear interpolation, or a spline interpolation to obtain correction values of the gain correction point intervals that are changed. The defect correction unit 110 obtains an image corrected based on the correction value of the gain correction unit 109, and corrects a defect of the obtained image. Defect correction is performed on the post-combination image obtained in the previous step S607. For a defect map indicating a position of defects of the combined image, a defect map that obtains a logical OR of a defect map of a high-gain and a defect map of a low-gain is generated, and it is possible to identify a position of a defect in a post-combination image according to the generated defect map.

As previously described, in the gain curve, the high-gain side shows better linearity than the low-gain side. There are defects that exists only on the low-gain side, and conversely there are defects that exists only on the high-gain side. Because of this, defect maps on the high-gain side and the low-gain side are held separately, and image combining can be performed after defect correction is performed separately. In this case, defect correction must be performed twice.

In step S608, when defect correction processing of the defect correction unit 110 finishes, the image that combined the image read in the two types of gain is obtained. By this, compared to a case of reading by a single gain, an image that has a wider dynamic range can be obtained. The two-dimensional image generation unit 112 performs image post-processing (such as sharpening processing, noise reduction, scattered light reduction, and gradation adjustment) on the obtained image in this way. Then, the CPU 114 performs display control for causing the image processed by the two-dimensional image generation unit 112 to display on the display apparatus 107. Alternatively, the two-dimensional image generation unit 112 can perform two-dimensional image processing of cross-sections after the three-dimensional image generation unit 113 reconstructs the image that is defect corrected in step S608 to a tomographic image. The CPU 114 performs display control for causing the image processed by the three-dimensional image generation unit 113 and the two-dimensional image generation unit 112 to display on the display apparatus 107. Alternatively, the CPU 114 can perform display control for causing a 3D model according to computer graphics to be displayed on the display apparatus 107 after generation of the tomographic image by the three-dimensional image generation unit 113.

Second Embodiment

Because leakage amounts relate to charge holding times relating to a charge accumulation time (hereinafter referred to as accumulation time), accumulation time dependency in the gain curve can be seen. In the first embodiment, although explanation is given regarding dependency of the dose of the pixel value using FIG. 4, in the present embodiment, explanation is given regarding processing in a case in which there is also a dependency of the accumulation time (Δt in FIG. 3A) for the gain curve.

FIG. 7A-FIG. 7B are views illustrating an accumulation time dependency in a relation between pixel value and dose. Dotted line 701 illustrated in FIG. 7A is a gain curve indicating a dependency of the dose of the pixel value in a case of an accumulation time w1. Dashed line 702 is a gain curve indicating a dependency of the dose of the pixel value in a case of an accumulation time w2. Solid line 703 is a gain curve indicating a result derived by a calculation for a particular accumulation time w. Here, the relation of the accumulation times are w1<w2. Because the accumulation time w2 is longer than the accumulation time w1, charge holding time is longer for w2. Accordingly, leakage increases, and in the gain curve (dashed line 702) of the accumulation time w2, a large reduction of the pixel value can be seen. Reduction of the pixel value arising when the dose is higher than the first inflection point dVth is already explained using FIG. 4.

The radiation imaging apparatus of the present embodiment is capable of determining gain curves for separate accumulation times to obtain a more accurate correction (specifically, a higher signal-to-noise ratio (SNR)). The gain correction unit 109 of the present embodiment obtains an image captured by a first charge accumulation time and an image captured by a second charge accumulation time different to the first charge accumulation time if the dose of a pixel exceeds a capacitance switching point at which a destination of accumulation of charge is changed from the first capacitance to the second capacitance. Also, the gain correction unit 109 can interpolate or extrapolate a relation of a first charge accumulation time and pixel values of an image captured by the first charge accumulation time, and a relation of a second charge accumulation time different to the first charge accumulation time and pixel values of an image captured by the second charge accumulation time, to obtain a gain curve of a particular accumulation time.

If a leakage amount corresponding to a unit accumulation time does not depend on accumulation time, the relation between the pixel value and the accumulation time is linear as illustrated in FIG. 7B. For this reason, when the pixel values for the two points of the accumulation time w1 and w2 are obtained, a graph indicating a relation of the accumulation times and pixel values can be interpolated or extrapolated in a shape of a linear function (y=ax+b).

More specifically, (w1, p1) and (w2, p2) are obtained as pairs of the accumulation time (w) and the pixel value (p) of the image captured by that accumulation time. These are substituted into the linear function y=ax+b to determine the coefficients a and b. Here, x is the accumulation time and y is the pixel value. Finally, a particular accumulation time w is substituted into the linear function after having determined the coefficients to determine the pixel value p. The gain curve for an arbitrary accumulation time can be obtained by performing this for each dose captured. If the pixel value (a value which is the intercept b of the respective linear function) at a time of accumulation time 0 is normalized as a reference, doses d4 and d10 are as illustrated in FIG. 7B.

A derivation result 703 as illustrated in FIG. 7A is the gain curve obtained in this way by calculation. With this, correction by an optimal gain curve becomes possible even if the accumulation time changes and the gain curve changes, and it is possible to obtain a higher signal-to-noise ratio.

FIG. 8 is a view illustrating a flow of capturing gain images for 2 accumulation times. Processing hereinafter is executed under the control of the CPU 114 and the control apparatus 105. Here, a parameter i is associated with an image capturing condition, and setting is such that as the parameter i increases, the captured dose becomes larger (for example, an mAs value of the radiation generation unit is caused to increase).

Firstly, in step S801, an irradiation condition at which the radiation dose is weakest (i=1 is the weakest condition) is set. Then, in step S802, the computer 104 obtains a gain image of a short accumulation time (gain image capture (short accumulation)) under the control of the CPU 114 and the control apparatus 105. Here, pay attention to the fact that an accumulation time dependency is not seen in a dose region lower than the first inflection point (the capacitance switching point of a photodiode: dVth) as illustrated in FIG. 7A. As described in the first embodiment, this is because a photodiode leak occurs in a region (low density region) at which the capacitance of the photodiode is large. Specifically, for a condition for which the dose is lower than the capacitance switching point, the accumulation time dependency is not be seen because a photodiode leak does not occur in the first place. For this reason, obtainment of an image under conditions in which the dose is lower than the capacitance switching point (dVth) may be by a single accumulation time.

In step S803, the gain correction unit 109 determines whether or not the next captured dose di+1 exceeds the capacitance switching point based on the sensitivity of the detector and the mAs value, or the image capturing condition of the average value of the dose of the captured image or the like. If the captured dose di+1 does not exceed the capacitance switching point (step S803—No), the processing returns to step S802 and a capture of only the short accumulation time repeats. Meanwhile, if, by the determination of step S803, the captured dose di+1 is greater than or equal to the capacitance switching point (step S803—Yes), the processing proceeds to step S805, and a long accumulation time capture is newly performed (gain image capture (long accumulation)). In step S806, the parameter i is caused to increase, and the captured dose is set to be larger.

In step S807, under the control of the CPU 114 and the control apparatus 105, measurement times (short accumulation time and long accumulation time) are set, a capture of a gain image according to the short accumulation time is performed in step S808 (gain image capture (short accumulation)), and a capture of a long accumulation time is performed in step S809 (gain image capture (long accumulation)). Then, in step S810, the gain correction unit 109 uses a condition of the mAs value of the radiation generation unit or the like to determine whether or not the next image capturing condition exceeds the saturation dose. If not saturated (step S810—No), the processing proceeds to step S811, the parameter i is caused to increase, the captured dose is set to be larger, the processing that performs the capture of the gain image according to the short accumulation time is performed in step S808, and the capture of the long accumulation time in step S809 repeats. Meanwhile, if saturated (step S810—Yes) in the determination of step S810, the capture is terminated.

Since there is an accumulation time dependency in the dose region, there is also an accumulation time dependence for pixel defects. For this reason, a defect map is prepared for each accumulation time. In the present embodiment, 2 types of defect maps are prepared for long and short accumulation times (a high-gain defect map and a low-gain defect map), and are changed in accordance with accumulation time.

Figure 9:
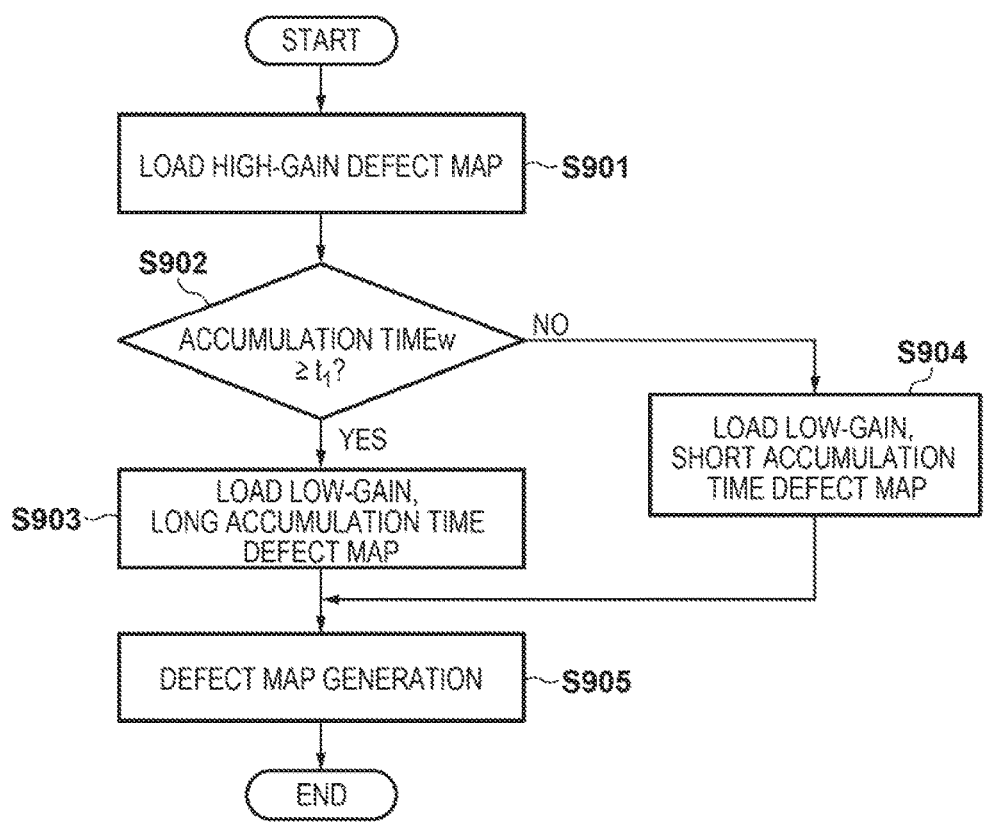
FIG. 9 is a view illustrating a flow for generation of a defect map.

FIG. 9 is a view illustrating a flow for generation of a defect map. In step S901, the defect correction unit 110 loads a high-gain defect map. Because a high-gain defect does not change much in accordance with accumulation time, the defect map is made to be common.

Next, in accordance with a set accumulation time, the defect correction unit 110, in step S902, determines which defect map of the high accumulation time or the low accumulation time is used. There are many defects due to photodiode leakage in a defect map of a long accumulation time. In accordance with the result of the determination, it is determined whether to use the defect map of step S903 or step S904. If, in step S902, the set accumulation time (w) does not exceed a predetermined reference time (t1) (No—step S902), the processing is advanced to step S904, and in step S904, the defect correction unit 110 loads a low-gain, short accumulation time defect map. Meanwhile, if, in the determination of step S902, the set accumulation time (w) does exceed a predetermined reference time (t1) (Yes—step S902), the processing is advanced to step S903, and in step S903, the defect correction unit 110 loads a low-gain, long accumulation time defect map.

Then, in step S905, the defect correction unit 110 combines the defect maps. That is, a defect map that combines the defect maps loaded in step S901, and step S903 or step S904 is generated. Note that the procedure for correcting the obtained image is similar to FIG. 6 of the first embodiment, and in this case a defect map and a gain curve according to an accumulation time calculated in the present embodiment are used in step S603 and in step S608. Specifically, the gain correction unit 109 obtains correction values at intervals of the gain correction points that are set. The defect correction unit 110 obtains an image corrected based on correction values of the gain correction unit 109, and corrects defects of the obtained image. The defect correction unit 110 obtains an image captured by a first charge accumulation time and an image captured by a second charge accumulation time different to the first charge accumulation time if the dose of a pixel exceeds a capacitance switching point at which a destination of accumulation of charge by saturation is changed from the first capacitance to the second capacitance. Also, the defect correction unit 110 generates a defect map that combines a first defect map indicating defect positions of pixels corresponding to the first charge accumulation time and a second defect map indicating defect positions of pixels corresponding to the second charge accumulation time as described in FIG. 9. Then, the defect correction unit 110 corrects an image that combines the image captured by the first charge accumulation time and the image captured by the second charge accumulation time using the generated defect map.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-201538, filed Oct. 9, 2015, which is hereby incorporated by reference herein in its entirety.

What is claimed is:

1. A radiation imaging apparatus that has a plurality of pixels capable of outputting an image signal in accordance with an irradiation of radiation, the apparatus comprising:
   a processor; and
   a memory storing a program including instructions executed by the processor, the processor and the memory being operatively coupled to function as:
   a photoelectric conversion unit configured to have a first capacitance and a second capacitance as charge accumulation capacitances; and
   a gain correction unit configured to correct a pixel value in relation to a dose of the irradiated radiation based on an image signal outputted in accordance with a charge accumulated by the photoelectric conversion unit, wherein
   the gain correction unit changes an interval of gain correction points at which to perform the correction in accordance with a switch from the first capacitance to the second capacitance.

2. The radiation imaging apparatus according to claim 1, wherein the processor and the memory are operatively coupled to further function as an additional capacitance unit configured to have a charge accumulation region different to the photoelectric conversion unit, wherein
   the gain correction unit corrects a pixel value in relation to a dose of irradiated radiation based on a first image signal outputted based on a charge accumulated in the photoelectric conversion unit or on a second image signal outputted based on a charge accumulated in a state in which the photoelectric conversion unit and the additional capacitance unit are connected, and
   the gain correction unit changes an interval of gain correction points at which to perform the correction at a capacitance switching point at which a destination of accumulation of charge switches from the first capacitance to the second capacitance.

3. The radiation imaging apparatus according to claim 2, wherein the processor and the memory are operatively coupled to further function as:
   a switching unit configured to switch to a state in which the additional capacitance unit is connected to the photoelectric conversion unit or a state in which the additional capacitance unit is not connected to the photoelectric conversion unit;
   a first signal holding unit configured to hold the first image signal outputted based on the charge accumulated in the photoelectric conversion unit in the state in which the additional capacitance unit is not connected;
   a second signal holding unit configured to hold the second image signal outputted based on the charge accumulated in the state in which the photoelectric conversion unit and the additional capacitance unit are connected, wherein
   the gain correction unit corrects a pixel value in relation to a dose of the irradiated radiation based on the first image signal held in the first signal holding unit or the second image signal held in the second signal holding unit, and
   the gain correction unit changes an interval of gain correction points at which to perform the correction at a capacitance switching point at which a destination of accumulation of charge switches from the first capacitance to the second capacitance.

4. The radiation imaging apparatus according to claim 2, wherein the gain correction unit sets an interval of gain correction points in which the capacitance switching point is included to be narrower than an interval of gain correction points in which the capacitance switching point is not included.

5. The radiation imaging apparatus according to claim 2, wherein the gain correction unit sets to increase an interval of the gain correction points in accordance with a dose increasing in excess of the capacitance switching point.

6. The radiation imaging apparatus according to claim 2, wherein the gain correction unit sets to increase an interval of the gain correction points in accordance with a dose decreasing from the capacitance switching point.

7. The radiation imaging apparatus according to claim 2, wherein the gain correction unit obtains information of an inflection point other than the capacitance switching point that is included in a gain curve that indicates a relation between dose and pixel value, and
   sets an interval of gain correction points in which the inflection point is included to be smaller than an interval of gain correction points in which that the inflection point is not included.

8. The radiation imaging apparatus according to claim 7, wherein the gain correction unit sets to increase an interval of the gain correction points in accordance with a dose increasing in excess of the inflection point.

9. The radiation imaging apparatus according to claim 7, wherein the gain correction unit sets to increase an interval of the gain correction points in accordance with a dose decreasing from the inflection point.

10. The radiation imaging apparatus according to claim 7, wherein the plurality of pixels is arranged in a two-dimensional region, and
the gain correction unit obtains a dose of a pixel arranged in a central portion of the two-dimensional region and a dose of a pixel arranged on the peripheral portion of the two-dimensional region.

11. The radiation imaging apparatus according to claim 10, wherein the gain correction unit changes an interval of the gain correction points based on the dose of the pixel arranged in the central portion and the dose of the pixel arranged in the peripheral portion.

12. The radiation imaging apparatus according to claim 11, wherein the gain correction unit sets an interval of the gain correction points to be narrower when the dose of the pixel arranged in the central portion and the dose of the pixel arranged in the peripheral portion reach a dose corresponding to the capacitance switching point.

13. The radiation imaging apparatus according to claim 11, wherein the gain correction unit sets an interval of the gain correction points to be narrower when the dose of the pixel arranged in the central portion and the dose of the pixel arranged in the peripheral portion reach a dose corresponding to the inflection point.

14. The radiation imaging apparatus according to claim 1, wherein the gain correction unit uses any one of a least-squares method, a linear interpolation, or a spline interpolation to obtain a correction value in the changed interval of the gain correction points.

15. The radiation imaging apparatus according to claim 14, wherein the gain correction unit obtains an image captured during a first charge accumulation time and an image captured during a second charge accumulation time different to the first charge accumulation time if a dose of a pixel exceeds a capacitance switching point at which a destination of accumulation of charge switches from the first capacitance to the second capacitance.

16. The radiation imaging apparatus according to claim 15, wherein the gain correction unit interpolates or extrapolates a relation of the first charge accumulation time and pixel values of an image captured during the first charge accumulation time, and a relation of the second charge accumulation time different to the first charge accumulation time and pixel values of an image captured during the second charge accumulation time, and obtains a gain curve of any accumulation time.

17. The radiation imaging apparatus according to claim 14, wherein the processor and the memory are operatively coupled to further function as a defect correction unit configured to obtain a corrected image based on the correction value and correct a defect of the obtained image, wherein
the defect correction unit obtains an image captured by a first charge accumulation time and an image captured by a second charge accumulation time different to the first charge accumulation time if a dose of a pixel exceeds a capacitance switching point at which a destination of accumulation of charge switches from the first capacitance to the second capacitance.

18. The radiation imaging apparatus according to claim 17, wherein the defect correction unit generates a defect map that combines a first defect map indicating a defect position of a pixel corresponding to the first charge accumulation time and a second defect map indicating a defect position of a pixel corresponding to the second charge accumulation time.

19. The radiation imaging apparatus according to claim 18, wherein the defect correction unit corrects an image that combines an image captured by the first charge accumulation time and an image captured by the second charge accumulation time using the generated defect map.

20. A method of controlling a radiation imaging apparatus having a plurality of pixels capable of outputting an image signal in accordance with an irradiation of radiation and a photoelectric conversion unit that has a first capacitance and a second capacitance as charge accumulation capacitances, the method comprising:
correcting a pixel value in relation to a dose of the irradiated radiation based on an image signal outputted in accordance with a charge accumulated by the photoelectric conversion unit, wherein
an interval of gain correction points at which to perform the correction is changed in accordance with a switch from the first capacitance to the second capacitance.

* * * * *